United States Patent [19]

Andres et al.

[11] 4,175,633

[45] Nov. 27, 1979

[54] INSTALLATION FOR FEEDING THE LOCK TONGUE AND/OR THE BELT BAND OF A BELT SYSTEM

[75] Inventors: Rudolf Andres, Sindelfingen; Eduard Ament, Gechingen, both of Fed. Rep. of Germany

[73] Assignee: Daimler-Benz Aktiengesellschaft, Fed. Rep. of Germany

[21] Appl. No.: 888,745

[22] Filed: Mar. 21, 1978

[30] Foreign Application Priority Data

Mar. 25, 1977 [DE] Fed. Rep. of Germany ....... 2713172

[51] Int. Cl.² ............................................. B60R 21/02
[52] U.S. Cl. ..................................... 180/270; 280/807
[58] Field of Search ............... 180/82 C; 297/384, 388, 297/389; 280/744, 747

[56] References Cited

U.S. PATENT DOCUMENTS

| | | | |
|---|---|---|---|
| 3,770,078 | 11/1973 | Keppel et al. ................... | 297/388 X |
| 3,794,135 | 2/1974 | Ewert et al. ........................ | 180/82 C |
| 3,807,523 | 4/1974 | Fiala et al. ......................... | 180/82 C |
| 3,842,929 | 10/1974 | Wada et al. ........................ | 180/82 C |
| 3,860,260 | 1/1975 | Kazaoka et al. ................ | 180/82 C X |
| 3,882,955 | 5/1975 | Kaneko .............................. | 180/82 C |
| 3,915,254 | 10/1975 | Nagano .............................. | 180/82 C |
| 3,985,193 | 10/1976 | Akiyama et al. ................... | 180/82 C |

FOREIGN PATENT DOCUMENTS 2108483 9/1972 Fed. Rep. of Germany ........ 180/82 C

Primary Examiner—Albert J. Makay
Assistant Examiner—Terrance L. Siemens
Attorney, Agent, or Firm—Craig and Antonelli

[57] ABSTRACT

An installation for feeding the lock-tongue and/or the belt-band of a safety belt system, especially of a three-point safety belt with belt roller, into a position favorable for the fastening of the belt in a preferably two-door passenger motor vehicle, in which after boarding of the vehicle, the lock-tongue and/or the belt-band is transferred by a servo-mechanism from a rearward position not impairing the free access to the rear seats in the course of a rectilinear feed movement into a forward position coordinated to the driver or co-driver; the servo-mechanism together with the lock-tongue and/or belt-band returns into the starting position immediately after the termination of the belt-engaging operation and after a predetermined or freely selectable time interval in case the lock-tongue and/or the belt-band is not picked up.

22 Claims, 8 Drawing Figures

INSTALLATION FOR FEEDING THE LOCK TONGUE AND/OR THE BELT BAND OF A BELT SYSTEM

The present invention relates to an installation for feeding the lock-tongue and/or the belt-band of a belt system, especially of a three-point safety belt with a belt roller, into a position favorable for seizing the lock-tongue and/or belt-band for purposes of engagement of the belt in a preferably two-door passenger motor vehicle, whereby after boarding of the motor vehicle, the lock-tongue and/or the belt-band are transferred by a servo-mechanism from a rear position not impairing the free access to the rear seats in the course of a rectilinear feed movement into a forward position coordinated to the driver and/or the co-driver.

Such an installation is described in the German Offenlegungsschrift No. 2,108,483 whereby the feed mechanism remaining during the drive in its forward position accommodates the lock-tongue, which prior to fastening the seat belt, has to be taken off and after the disengagement of the belt, has to be hung up again. This handling is complicated and is realizable only with difficulties in darkness. Additionally, the extended feed mechanism represents an injury danger especially when the passenger has not engaged or fastened the belt and a lateral impact takes place.

It is the aim of the present invention to provide a feed installation which can be handled easily and which does not entail any injury danger during the driving operation.

Consequently, an installation of the aforementioned type is proposed, whereby, according to the present invention, the servo-mechanism returns into the starting position together with the lock-tongue loosely held prior to use and/or with the belt-band immediately after the termination of the engaging operation and after a predetermined or freely selectable time interval with a non-removed lock-tongue and/or belt-band.

In a preferred embodiment of the present invention a switch is actuated when engaging the lock-tongue into the belt lock, by means of which the servo-mechanism is reversingly controlled and set into operation.

If, however, the passenger does not wish to fasten the belts, then a timer mechanism becomes operative which, after a predetermined period of time that is longer than the time necessary for the fastening or engagement of the belt, controls the servo-mechanism for reversal thereof and sets the same into operation.

The timer mechanism can be dispensed with if a switch is arranged at a place easily reachable by the driver and co-driver upon actuation of which the servo-mechanism is controlled for reversal and set into operation.

A structural unit requiring relatively little space for its installation can be created if an electric motor is provided as servo-mechanism whose rotary movement is transmitted by way of an interconnected transmission mechanism onto a feed-arm carrying out a rectilinearly rising movement.

Damages or injuries are prevented with a non-free or obstructed movement path, if an overload safety device of any known construction is coordinated to the servo-mechanism.

In one preferred embodiment of the present invention, the free end of the feed-arm, at which abuts the lock-tongue at least during the feed movement, is constructed as through-fitting permitting the passage therethrough of the belt, which continuously surrounds the belt-band and which disengages from the feed arm during the return operation when encountering an obstacle.

A through-sliding of the belt-band free of twisting during the belt-engaging operation can be achieved if the through-fitting is provided with a triangularly shaped aperture standing on its head and having an external shape essentially parallel thereto.

However, it is also possible to provide the through-fitting with a slot-guidance which carries out a forcibly or positively controlled pivot movement during the sliding movement of the feed arm.

Accordingly, it is an object of the present invention to provide an installation for feeding the lock-tongue and/or the belt-band of a safety belt system of a motor vehicle, which avoids by simple means the aforementioned shortcomings and drawbacks encountered in the prior art.

Another object of the present invention resides in an installation for feeding the lock-tongue and/or the belt-band of a motor vehicle safety belt system which permits an easy and uncomplicated handling that can be carried out also without difficulties in darkness.

A further object of the present invention resides in an arrangement for the feeding of the lock-tongue and/or the belt-band of a safety belt system which eliminates any injury danger during the drive, in case the passenger does not engage the safety belt.

A still further object of the present invention resides in an installation for feeding the lock-tongue and/or the belt-band of a safety belt system of motor vehicles, which requires relatively little space for its installation and effectively prevents injuries when the movement path for the feed arm is obstructed by an obstacle.

Another object of the present invention resides in a safety belt system for motor vehicles which greatly facilitates the engagement of the safety belt, especially in case of a two-door passenger motor vehicle without impairing the free access to the rear seats of the vehicle.

A further object of the present invention resides in a safety belt system for motor vehicles of the type described above which is simple in construction, reliable in operation and requires relatively few, inexpensive parts.

These and other objects, features and advantages of the present invention will become more apparent from the following description when taken in connection with the accompanying drawing which shows, for purposes of illustration only, several embodiments in accordance with the present invention, and wherein.

Figure 1:
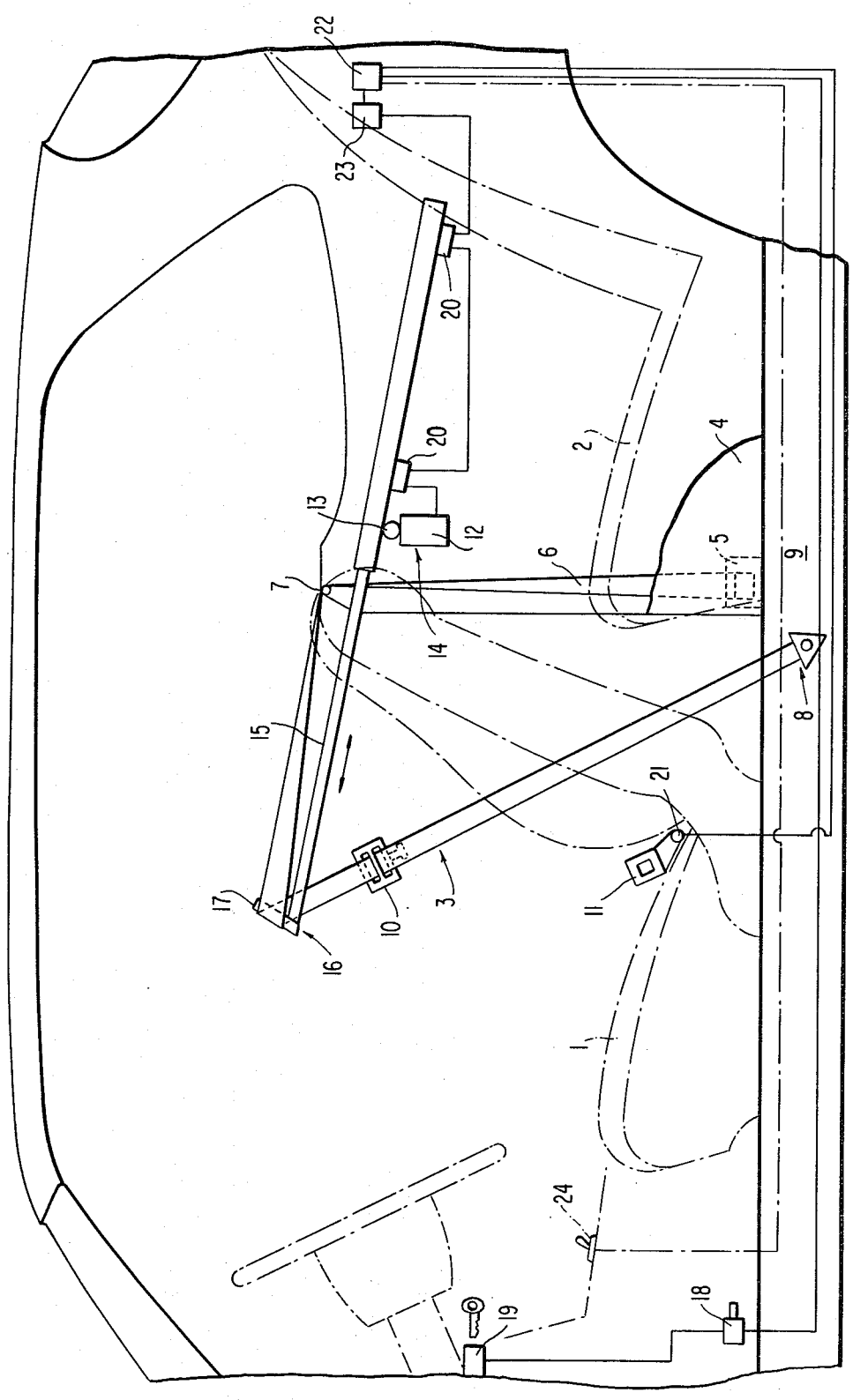
FIG. 1 is a partial schematic side elevational view of a passenger motor vehicle illustrating the arrangement of an installation for feeding the lock-tongue and/or belt-band of a safety belt system in accordance with the present invention.

Referring now to the drawing wherein like reference numerals are used throughout the various views to designate like parts with prime marks to distinguish between embodiments, a two-door passenger motor vehicle indicated only schematically in FIG. 1 and having front seats 1 and rear seats 2 is equipped with three-point automatic safety belts generally designated by reference numeral 3 for the front passengers. The belt-band 6 is guided from a belt roller 5 covered in the direction toward the interior of the vehicle by a covering 4 by way of a deflection fitting 7 located at the top side of the covering 4. The free end 8 of the belt-band 6 is secured on the inside of the bearer 9 whereas a belt-lock 11 receiving the belt-tongue 10 projects from the center tunnel (not shown).

A servo-mechanism 14 essentially consisting of an electric motor 12 and of a transmission mechanism 13 and covered by the upwardly extending covering 4, is equipped with a feed-arm 15. The free end 16 of the feed-arm 15 receives a through-fitting 17 for the passage therethrough of the belt-band 6, whereby the lock-tongue 10 is arranged in front of the fitting 17.

Figure 2:
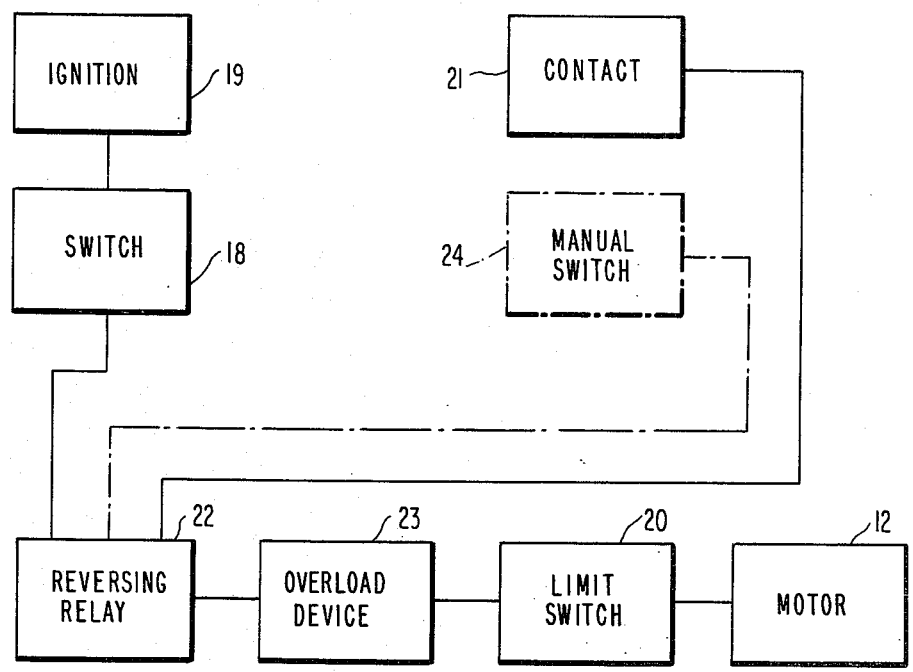
FIG. 2 is a block diagram of the installation according to FIG. 1.

The operation of the installation according to the present invention is to be explained hereinafter by reference to FIG. 1 and to the block diagram according to FIG. 2. With an unoccupied vehicle, the feed arm 15 is in its retracted position opposite the position illustrated in FIG. 1. The belt-band 6 is then wound up by the belt winding or roller mechanism 5, and the lock-tongue 10 abuts at the through-fitting 17 which, in its turn, is located only slightly in front of the deflection fitting 7. If the driver or co-driver boards the vehicle and closes a vehicle door (not shown), then the door contact switch 18 is closed. If now the ignition 19 is turned on, then the feed movement of the feed-arm 15 starts.

It is thereby possible by conventional measures simple from a circuit point of view to actuate both feed arms 15 simultaneously, yet to assure that, for example, with a time-displaced boarding of the co-driver, at least the feed arm 15 coordinated to the same is displaced immediately into its starting position enabling a comfortable boarding.

It is, however, also feasible within the scope of the present invention to so control both feed arms that only the actually required feed arm 15 is set into operation.

In lieu of the door contact switch 18, also a conventional seat contact switch could be provided. At the end of the feed movement which takes place rectilinearly obliquely upwardly and which is limited by a limit switch 20, the lock-tongue 10 assumes a position favorable for being seized and can then be guided simply to the belt-lock 11. During the engagement of the lock-tongue 10, a contact 21 is closed in the belt-lock 11, whereupon a reversing relay 22 is actuated. The direction of rotation of the motor 12 is reversed thereby in a conventional manner and the motor 12 returns the feed-arm 15 into its starting position, whereby the motor 12 is turned off by a further limit switch 20. If during the motor rotation the feed-arm 15 should encounter an obstacle, then an overload device 23 of conventional construction responds which interrupts the motor current.

During the opening of the belt-lock 11, the lock-tongue 10—as known from automatic belt systems—is displaced in the direction of the through-fitting 17 abutting at the covering 4 and the loose belt-band 6 continues to be automatically wound up for such length of time until the same is taut and the free access to the rear seats 2 is not impaired.

If the driver or co-driver after the turning-on of the ignition 19 forgets to insert the lock-tongue 10 which is now offered in a manner favorable for gripping, into the belt lock 11 or intentionally dispenses with the belt engagement, then the feed arm 15 together with the lock-tongue 10 located in front thereof automatically returns into its starting position after a predetermined or selectable time interval which is longer than the time interval required for engagement of the belt-triggered by a timer mechanism integrated into the shifting relay 22. This automatic circuit can also be replaced by a manually actuated switch 24, indicated in FIG. 1 and also indicated in dash and dotted lines in FIG. 2, which may be placed at a location that can be conveniently reached by the driver and the co-driver.

Figure 3:
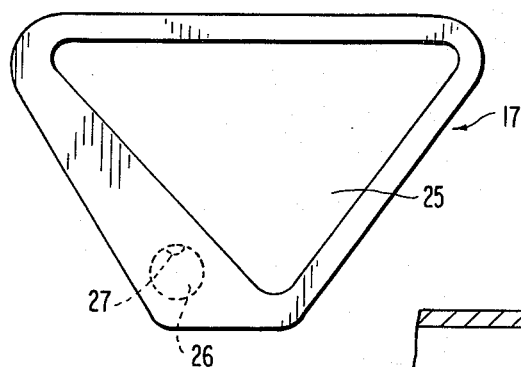
FIG. 3 is a front elevational view of a through-fitting with a triangular aperture in accordance with the present invention.
Figure 4:
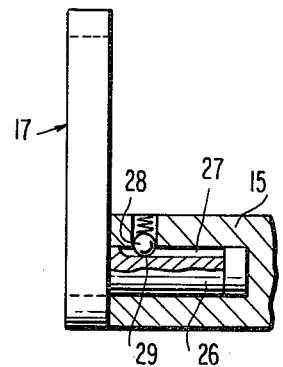
FIG. 4 is a side elevational view, partly in cross section, of the emplaced through-fitting according to FIG. 3.

As shown in FIG. 3, the through-fitting 17 is provided with an aperture 25, through which the belt-band 6 is guided in a conventional manner (not shown). The aperture 25 has a triangularly shaped configuration standing on its head so that the side of the triangle facing the vehicle interior forms during the engaging operation an approximately right-angle to the belt-band pull-out direction and an anti-twisting protection is achieved thereby. The connection of the through-fitting 17 with the feed-arm 15 takes place by way of a pin 26 connected with the through-fitting 17, which includes an anti-rotation means, for example, a groove 27, into which engages a spring-loaded ball 28 accommodated in the feed-arm 15 safe against loss. The groove 27 includes a recess 29, into which engages the ball 28 with a fully inserted pin 26. As a result thereof, it is achieved that during the abutment or impingement of the through-fitting 17 at an obstacle during the return movement, the through-fitting 17 can readily disengage from the feed-arm 15.

Figure 6:
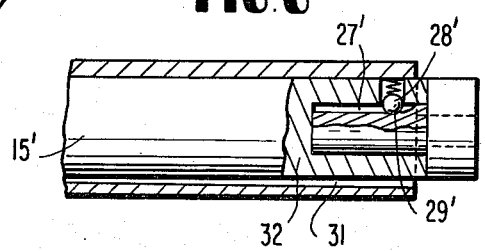
FIG. 6 is a partial cross-sectional view through the arrangement of FIG. 5, taken along line V—V of FIG. 5.
Figure 5:
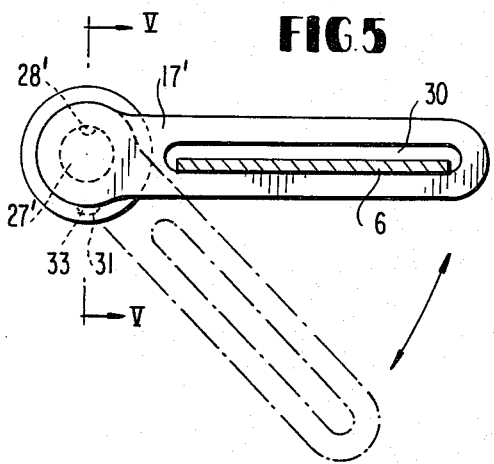
FIG. 5 is a front elevational view of an installed through-fitting with a slot guidance and rotational control in accordance with the present invention.

The through-fitting 17 according to FIGS. 5 and 6 includes a slot guidance 30 for the belt-band 6. Starting from the initial position of the through-fitting 17 illustrated in full lines, the through-fitting 17 carries out a forcibly or positively controlled pivot movement during its transfer into the extended position illustrated in dash and dotted lines. This is achieved in that the feed-arm 15 is received by a tubular member which is provided along its inner side with a spirally shaped groove 31, into which engages a pin 33 (FIG. 5) projecting from an insert 32. The insert 32 (FIG. 6) thereby receives the through-fitting 17 in the described manner.

Figure 7:
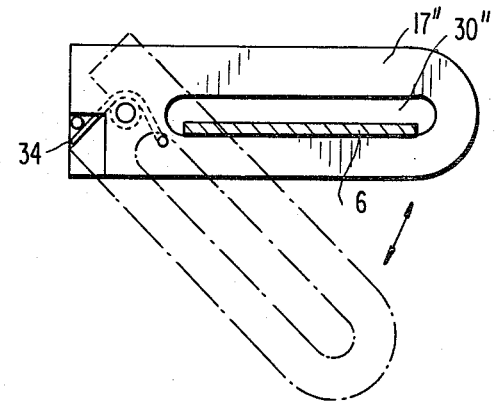
FIG. 7 is a front elevational view through a further modified embodiment of a through-fitting with a slot guidance in accordance with the present invention.
Figure 2A:
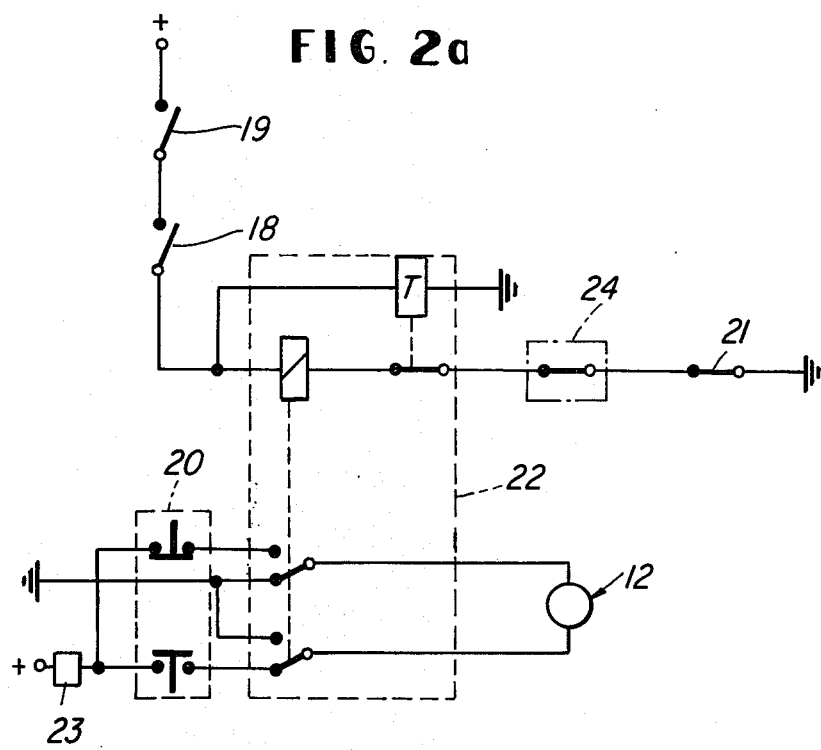
FIG. 2a is a schematic diagram in accordance with the block diagram of FIG. 2.

The embodiment according to FIG. 7 corresponds essentially to that of FIGS. 5 and 6. However, the pivot movement is produced by the belt-band 6 against the force of a leg spring 34 supported at the through-fitting 17, on the one hand, and at the feed-arm (not shown in detail), on the other. The coupling of the through-fitting with the feed-arm takes place in the manner already described hereinabove, and therefore not illustrated for the sake of simplicity.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for feeding a part of a safety belt system into a position favorable for the engagement of the belt, comprising servo-means operable after boarding of the vehicle to transfer said part from a rear position essentially allowing unimpaired access to the rear seat into a forward position accessible to the drive or co-driver, characterized in that the servo-means is operable to return said part into the rear position substantially immediately after the termination of the belt-engaging operation and after a predetermined time interval should said belt-engaging operation fail to be performed.

2. An installation according to claim 1, characterized in that the part is at least one of lock-tongue and belt-band of a safety belt system.

3. An installation according to claim 2, characterized in that the belt system is a three-point belt system with belt roller means.

4. An installation according to claim 3, characterized in that the transfer of said part is performed with a substantially rectilinear movement.

5. An installation according to claim 4, characterized in that the servo-means is operable to return into its starting position immediately after the termination of the engaging operation and with a non-picked-up lock-tongue or belt-band is operable to return to its starting position together with the loosely held lock-tongue and belt-band after a predetermined time interval.

6. An installation according to claim 5, characterized in that said time interval is freely selectable.

7. An installation with a belt-lock means according to claim 5, characterized in that upon engagement of the lock-tongue into the belt-lock means, a switch is actuated, by means of which the servo-means is controlled for reversal and set into operation.

8. An installation according to claim 7, characterized in that a timer means is provided which after a predetermined time that is longer than the time required for the engagement, controls the servo-means for reversal and sets the same into operation.

9. An installation according to claim 8, characterized in that a switch means is provided at a place that can be readily reached by the driver and co-driver whose actuation controls the servo means for reversal and sets the same into operation.

10. An installation according to claim 9, characterized in that the servo-means includes an electric motor whose rotary movements are transmitted by way of an interconnected transmission means onto a feed-arm means carrying out a rectilinearly rising movement.

11. An installation according to claim 10, characterized in that an overload means is operatively associated with the servo-means.

12. An installation according to claim 11, characterized in that the free end of the feed-arm means, at which abuts the lock-tongue at least during the feed movement, is constructed as through-fitting means which continuously surrounds the belt-band and which disengages from the feed-arm means during the return movement in case of encountering an obstacle.

13. An installation according to claim 12, characterized in that the through-fitting means is provided with a triangularly shaped aperture standing on its head and having an external configuration essentially similar thereto.

14. An installation according to claim 12, characterized in that the through-fitting means is provided with a slot guidance means which during the movement of the feed-arm means, carries out a positively controlled pivot movement.

15. An installation with a belt-lock means according to claim 1 or 3, characterized in that upon engagement of a lock-tongue into a belt lock means, a switch is actuated, by means of which the servo-means is controlled for reversal and set into operation.

16. An installation according to claim 1 or 3, characterized in that a timer means is provided which after a predetermined time that is longer than the time required for the engagement, controls the servo-means for reversal and sets the same into operation.

17. An installation according to claim 1 or 3, characterized in that a switch means is provided at a place that can be readily reached by the driver and co-driver whose actuation controls the servo means for reversal and sets the same into operation.

18. An installation according to claim 1, characterized in that the servo-means includes an electric motor whose rotary movements are transmitted by way of an interconnected transmission means onto a feed-arm means carrying out a rectilinearly rising movement.

19. An installation according to claim 1, characterized in that an overload means is operatively associated with the servo-means.

20. An installation with a feed-arm means according to claim 2, characterized in that the free end of the feed-arm means, at which abuts the lock-tongue at least during the feed movement, is constructed as through-fitting means which continuously surrounds the belt band and which disengages from a feed-arm means during the return movement in case of encountering an obstacle.

21. An installation according to claim 20, characterized in that the through-fitting means is provided with a triangularly shaped aperture standing on its head and having an external configuration essentially similar thereto.

22. An installation according to claim 20, characterized in that the through-fitting means is provided with a slot guidance means which during the movement of the feed-arm means, carries out a positively controlled pivot movement.

* * * * *